W. H. C. HIGGINS, Jr.
PLOW LIFT.
APPLICATION FILED AUG. 23, 1913.
1,300,392.
Patented Apr. 15, 1919.
6 SHEETS—SHEET 6.
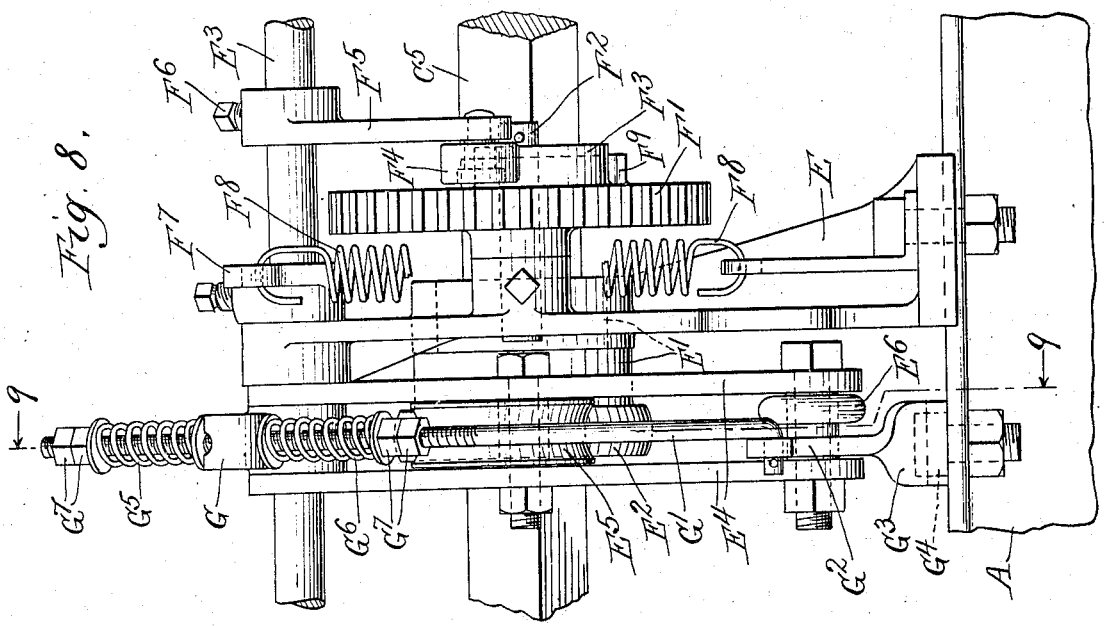
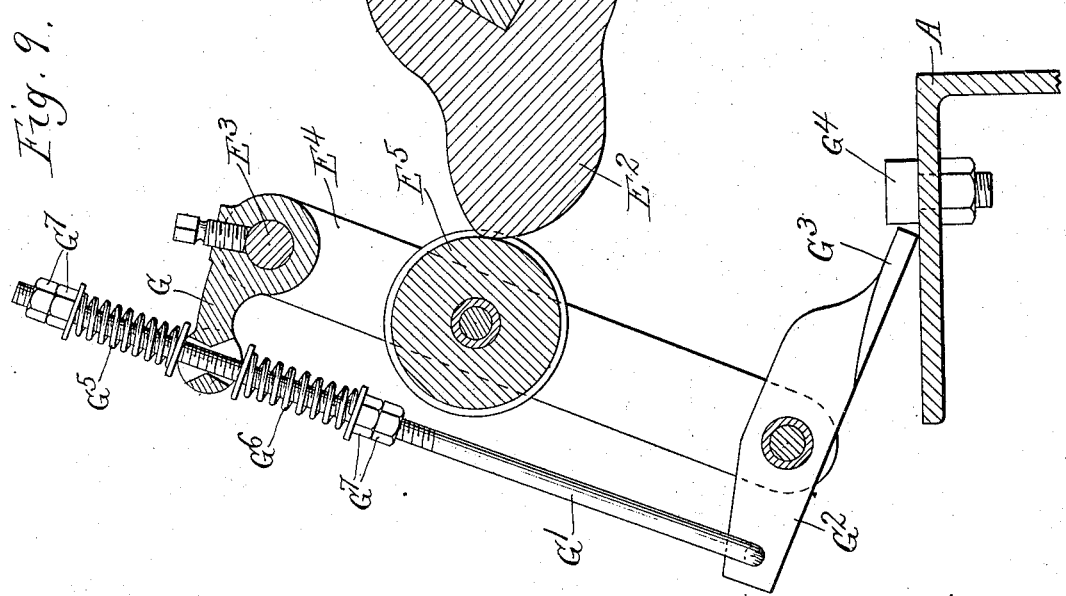
Witnesses
Edward T. Wray.
Laurel M. Doremus
Inventor
William H. C. Higgins Jr.
by Parker & Carter
Attorneys.

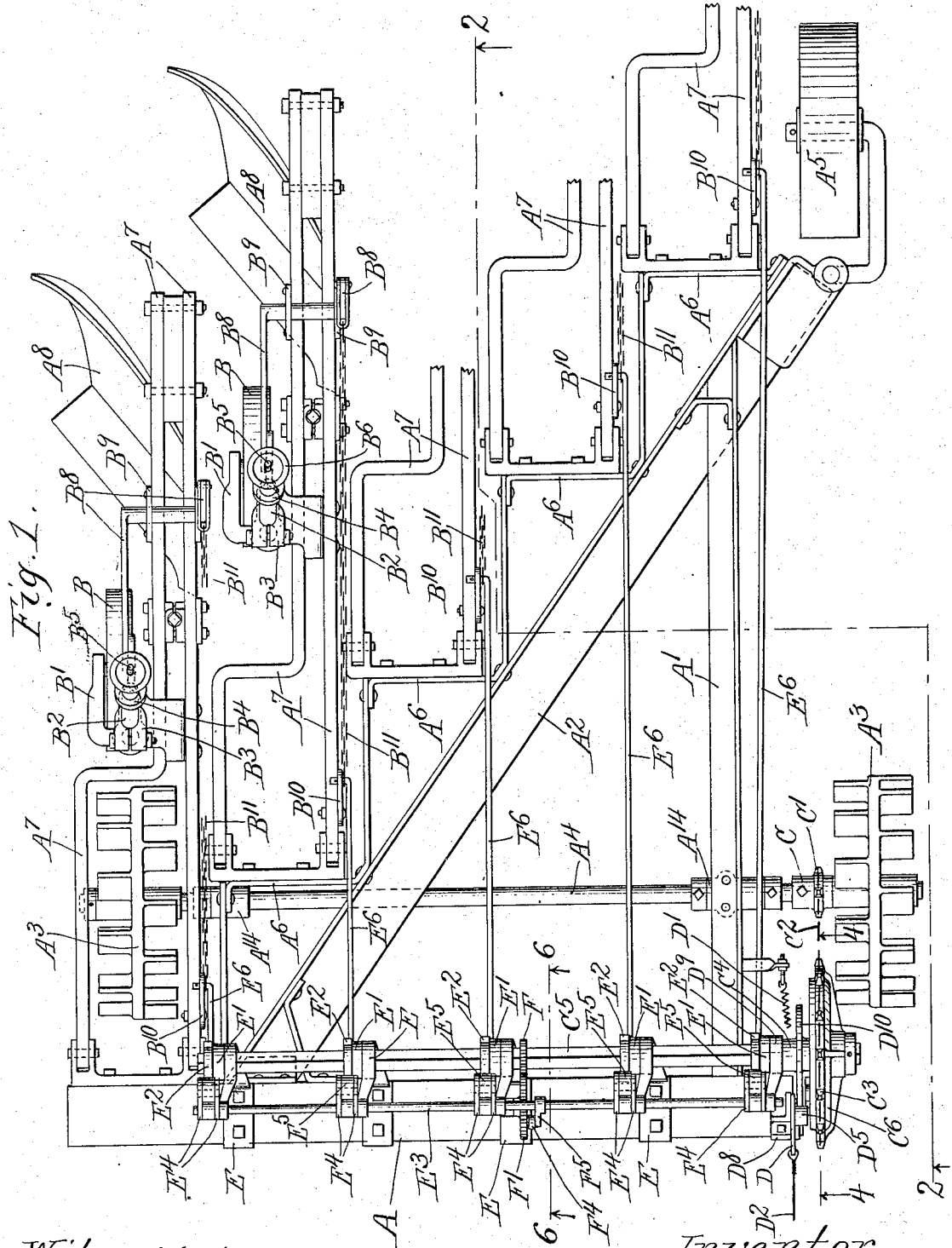

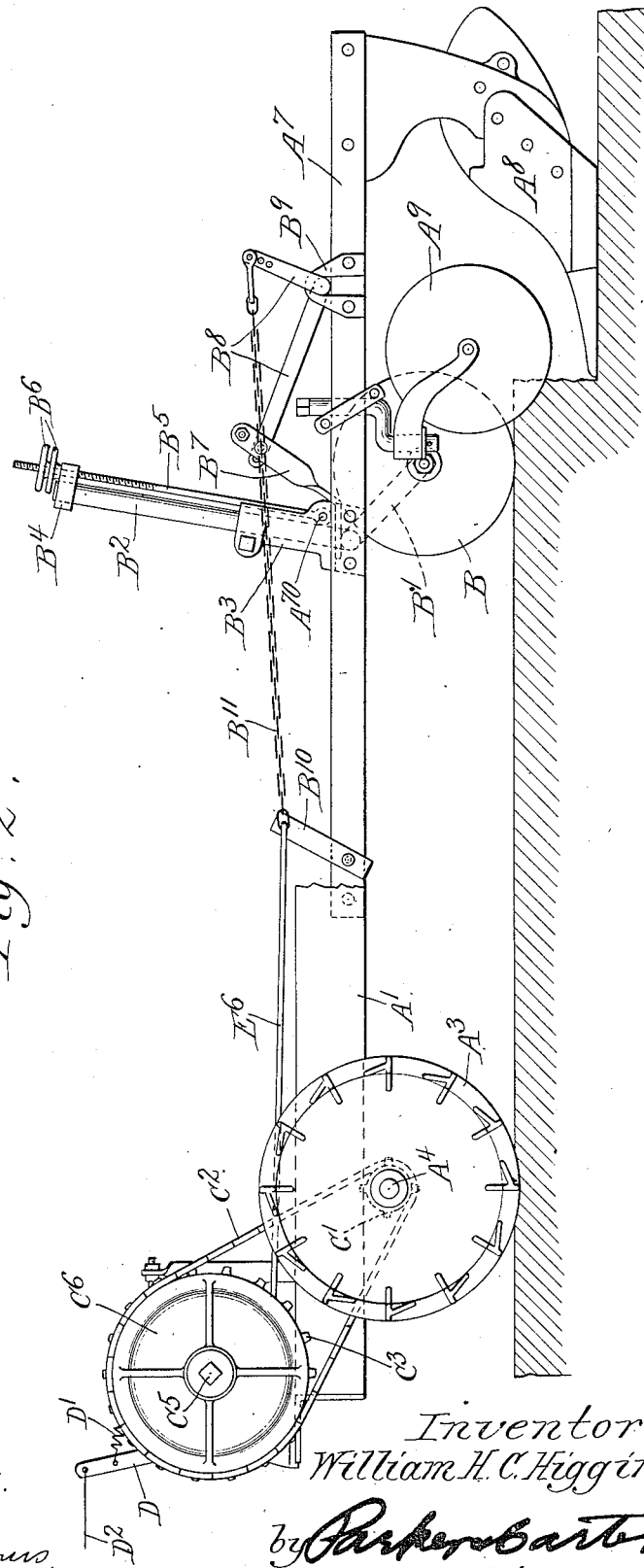

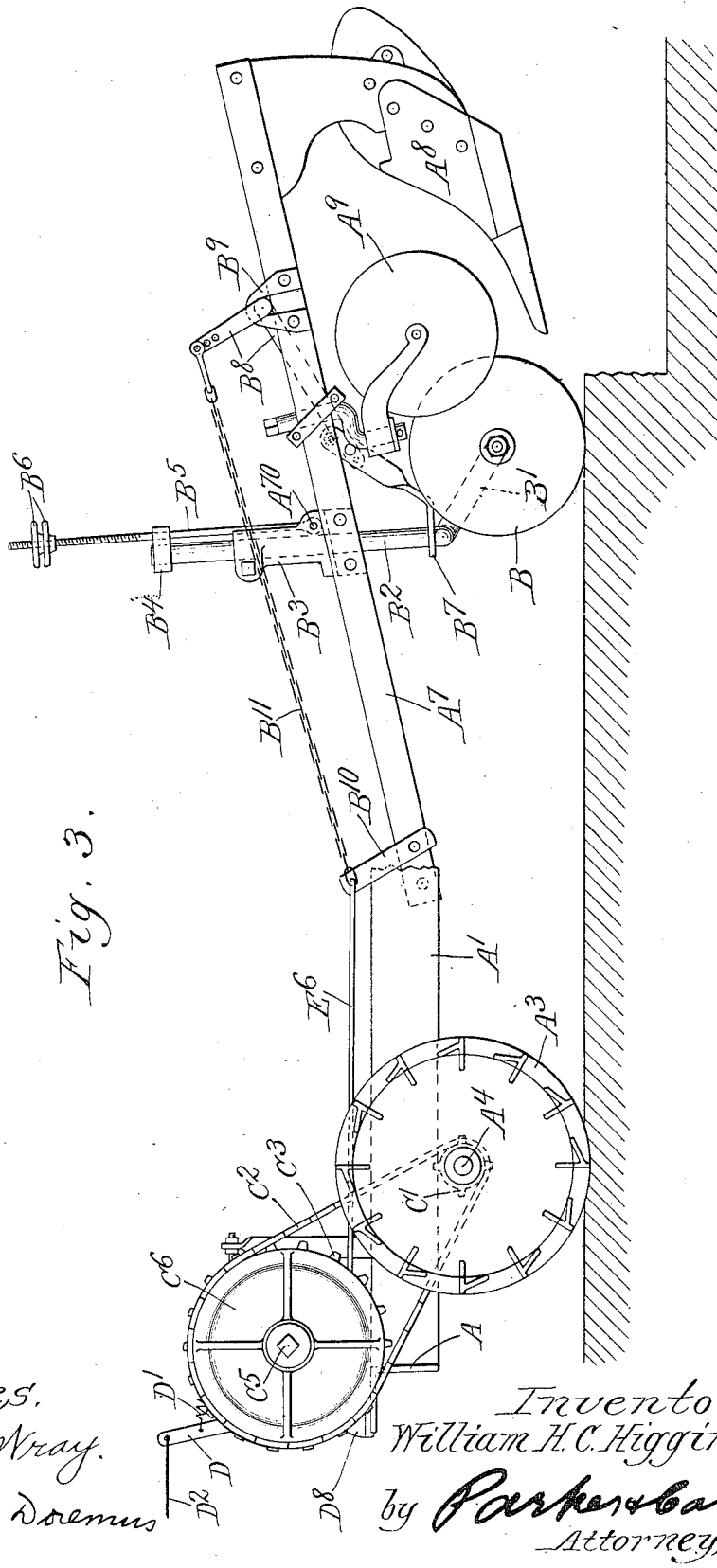

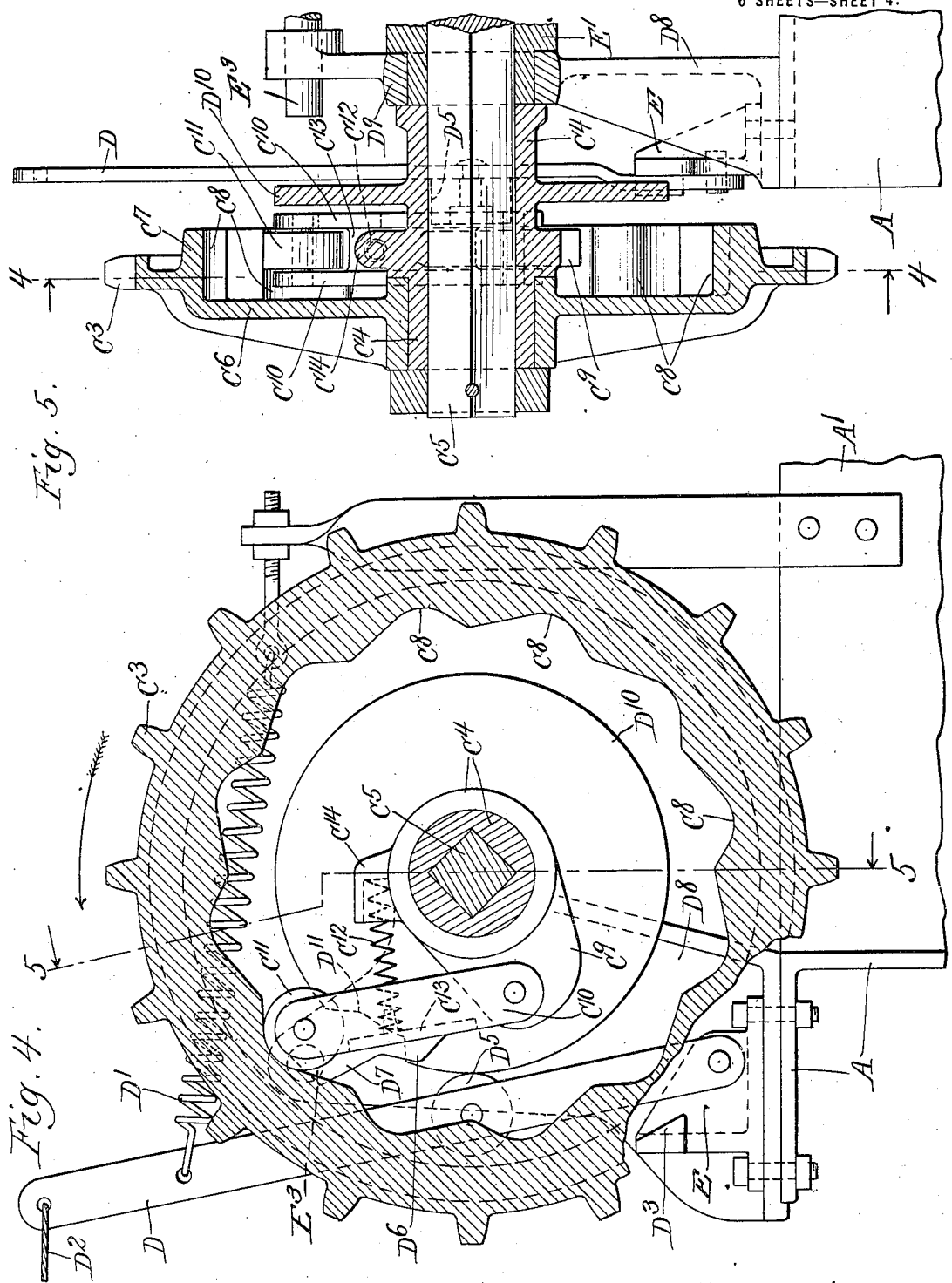

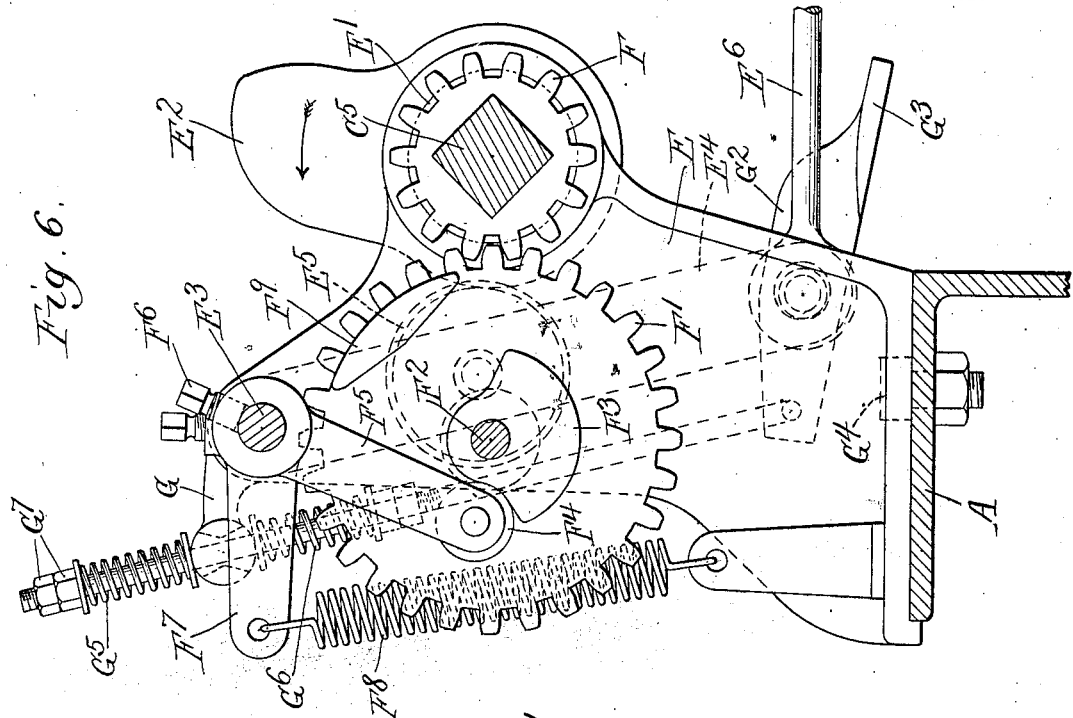
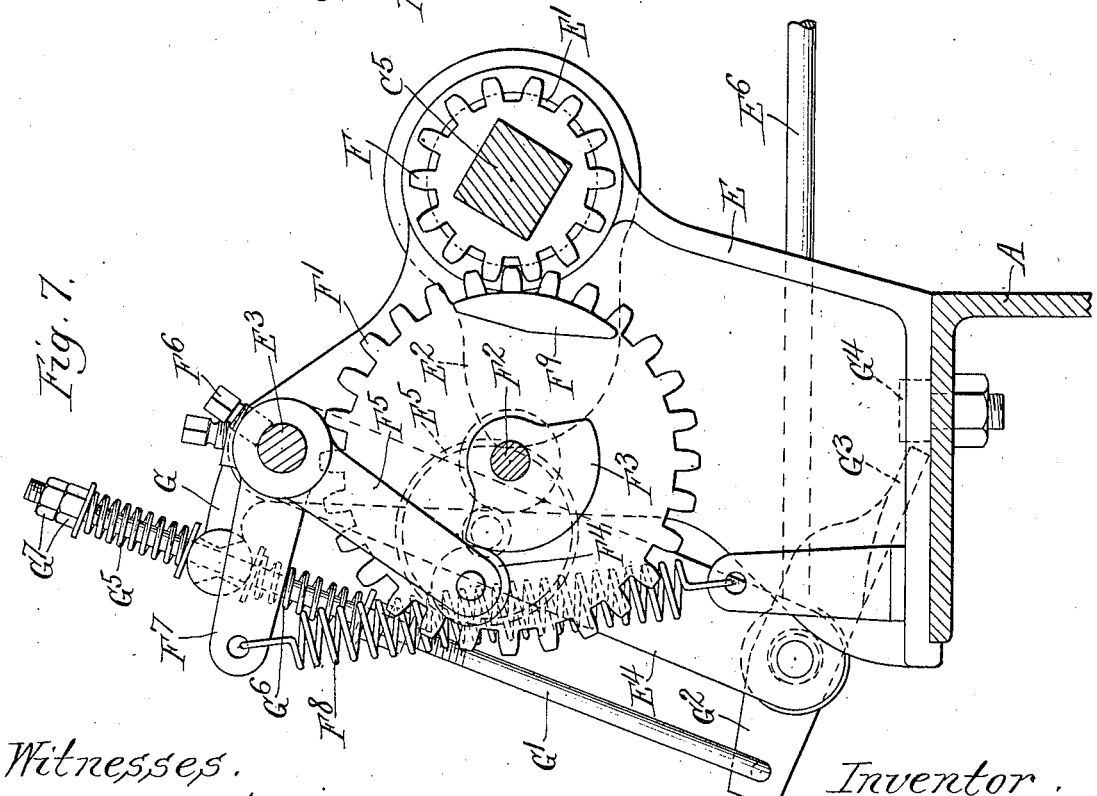

UNITED STATES PATENT OFFICE.

WILLIAM H. C. HIGGINS, JR., OF LAPORTE, INDIANA, ASSIGNOR, BY MESNE ASSIGNMENTS, TO ADVANCE-RUMELY COMPANY, OF LAPORTE, INDIANA, A CORPORATION OF INDIANA.

PLOW-LIFT.

1,300,392.

Specification of Letters Patent.

Patented Apr. 15, 1919.

Application filed August 23, 1913. Serial No. 786,211.

*To all whom it may concern:*

Be it known that I, WILLIAM H. C. HIGGINS, Jr., a citizen of the United States, residing at Laporte, in the county of Laporte and State of Indiana, have invented a certain new and useful Improvement in Plow-Lifts, of which the following is a specification.

My invention relates to improvements in gang plows and is illustrated diagrammatically in one form in the accompanying drawings, wherein—

Figure 1 is a plan view;

Fig. 2 is a section on line 2—2 of Fig. 1 with parts broken away and parts omitted;

Fig. 3 is a similar view to Fig. 2 showing the plow in the raised position;

Fig. 4 is a detail section on a large scale along the line 4—4 of Figs. 1 and 5 of the driving clutch;

Fig. 5 is a section along the line 5—5 of Fig. 4;

Fig. 6 is a section along the line 6—6 of Fig. 1 showing the plow raising and locking mechanism in the plowing position;

Fig. 7 is a similar section showing the mechanism in the lifting position the parts being shown as they are just after the first plow is lifted.

Fig. 8 is a front elevation with parts broken away of the central plow lifting mechanism shown in Fig. 1;

Fig. 9 is a section along the line 9—9 of Fig. 8.

Like parts are indicated by the same letters in all the figures.

A triangular plow frame made up of the cross-piece A, a side member $A^1$ and a diagonal member $A^2$, is supported at its forward end on the propeller wheels $A^3$ which are keyed on the axle $A^4$, which axle is rotatably mounted in the bearings $A^{14}$, and is supported at its rear end by the caster wheel $A^5$. Plow brackets or steps $A^6$ project outwardly and rearwardly from the diagonal member $A^2$ and have pivoted thereon the individual plow beams $A^7$, which beams carry any well-known type of mold-board plow $A^8$ and a wheel or disk colter $A^9$. A gage wheel B is pivotally mounted between the forks $B^1$ on the gage rod $B^2$, which rod is slidably mounted in a guide sleeve $B^3$, one on each of the plow frames $A^7$. The gage rod is provided with a collar $B^4$ at its upper end, perforate to slidably engage the adjusting screw $B^5$, which screw is provided with the adjusting wheels $B^6$ in opposition to the upper edge of the collar $B^4$ and is pivoted at its lower end to the plow frame at $A^{70}$. A connecting rod $B^7$ is loosely connected to the gage rod $B^2$ immediately above the forks $B^1$ and is in slidable and rotatable connection therewith and its upper end is pivoted on a bell crank lever $B^8$ rotatably mounted in a bracket $B^9$ supported on the two sides of the plow beam $A^7$. A swinging arm $B^{10}$, pivotally mounted on the plow beam $A^7$ adjacent its forward pivotal point, is connected by means of the chains $B^{11}$ with the free end of the bell crank lever $B^8$.

One of the wheels $A^3$ is provided with an elongated hub C carrying a sprocket pinion $C^1$ over which rides a sprocket chain $C^2$ to drive the sprocket gear $C^3$. This sprocket gear is rotatably mounted on a sleeve $C^4$ on the square shaft $C^5$, which shaft is rotatably mounted in bearings which hold it parallel with the frame member A. This sprocket gear $C^3$ is formed about the periphery of a clutch disk $C^6$ which disk has an overhanging annular wall $C^7$, the inner surface of which is serrated or corrugated as at $C^8$. A lug $C^9$ projects outwardly from the sleeve $C^4$ in the same plane as the wall $C^7$. Links $C^{10}$ on either side of said lug are pivoted upon it and have pivoted between their free ends a roller $C^{11}$. A spring $C^{12}$ engages on one end a web $C^{13}$ connecting the links $C^{10}$ and on the other end a lug $C^{14}$ on the sleeve $C^4$. This spring yieldingly presses the roller $C^{11}$ into the serrations $C^8$ on the clutch disk $C^6$. It will be noted that the angles are such that when the sprocket or clutch disk $C^6$ is rotated in the direction shown by the arrow, it will force the shaft $C^5$ to rotate in unison with it.

D is an operating lever pivoted on the member A drawn yieldingly toward the shaft $C^5$ by the spring $D^1$ and adapted to be actuated by the operator by means of the cord $D^2$ against the tension of the spring $D^1$. $D^3$ is a stop to limit the outward movement of the lever D away from the shaft $C^5$. $D^5$ is a controlling roller mounted on the lever D in the path of the link $C^{10}$ and adapted to engage the cam surfaces $D^6$, $D^7$ on said link so that as the shaft $C^5$ rotates, carrying with it the link, it will at the completion of each revolution come into such relation with the roller $D^5$ that this roller rides up on the cam surfaces $D^6$, $D^7$ and rotates the link $C^{10}$ back toward the shaft $C^5$ against the compression of the spring $C^{12}$ to draw the roller $C^{11}$ out of engagement with the clutch disk $C^6$. A bracket $D^8$ has a bearing $D^9$ in which is rotatably mounted the cam sleeve $E^1$ to support one end of the shaft $C^5$, together with the clutch mechanism. The cam disk $D^{10}$ is mounted on and rotates with the sleeve $C^4$ and is notched as indicated at $D^{11}$ to permit the roller $D^5$ which normally rides therealong to drop into the notch and approach more closely to the shaft $C^5$, thus to insure that the roller $C^{11}$ and link $C^{10}$ will be forced sufficiently far back to bring the roller out of register with the serrations $C^8$.

Brackets E are mounted on the frame A at points equidistant along the shaft $C^5$ and have rotatably mounted therein sleeves $E^1$ on the square shaft $C^5$. These sleeves carry cams $E^2$ which are held by the shape of the shaft against rotation thereabout. A rock shaft $E^3$ extends along the frame A above and in front of the shaft $C^5$, being supported in the brackets E. Pivoted on this rock shaft at points along the frame A are plow lifting levers $E^4$, these levers being made of two parallel spaced bars. Between each pair of bars is located a roller $E^5$ in opposition to the cam $E^2$. A link $E^6$ is pivoted to the lower end of each of said levers and is pivotally connected at its free end to the lever $B^{10}$ whereby as the cams $E^2$ in rotating with the shaft $C^5$ come in contact with the rollers $E^5$, the levers will be sprung or locked and the plow lifted by the tension of the link $E^6$ which rotates the swinging arm $B^{10}$ and operates the bell crank $B^8$ to raise the frame $A^7$ with respect to the gage wheel B.

F is a pinion rigidly mounted on the shaft $C^5$ and in mesh with the gear $F^1$, which gear is rotatably mounted on a subshaft $F^2$ on one of the brackets E. This gear carries a cam $F^3$ in opposition to which is a roller $F^4$ on the rocker arm $F^5$, which rocker arm is held by the set screw $F^6$ on the shaft $E^8$ against rotation thereabout. $F^7$ is a further rocker arm rigidly attached to the shaft $E^3$ and $F^8$ is a spring yieldingly drawing the rocker arm $F^7$ down to hold the cam roller $F^4$ against the cam $F^3$.

G, G are rocker arms rigidly attached to the shaft $E^3$ one adjacent each of the levers $E^4$. $G^1$, $G^1$ are controlling rods slidably mounted in the end of the rocker arms G and pivoted at their lower ends to latch levers $G^2$, which levers are pivoted to the lower ends of the lifting levers $E^4$. This latch is provided with a latching lip $G^3$ in opposition to a stop $G^4$. Springs $G^5$, $G^6$ surround the shaft $G^1$, being arranged one above and the other below the rock shaft G. Nuts $G^7$ are provided to adjust the tension of said springs so that movement of the rock shaft $E^3$ may be transmitted through the rocker arm G and the springs $G^5$ or $G^6$ as the case may be to the sliding rod $G^1$ to actuate the latch.

In Figs. 6 and 7 is shown the cam $F^9$ in opposition to the cam $F^3$ and mounted on the gear $F^1$ whereby the roller $F^4$ on the rocker arm $F^5$ is contacted to positively rotate the rock shaft $E^3$ to the inner released position so that there may be no possibility of weakness or breaking of the spring $F^8$ causing the plows to be not released at the proper time.

The use and operation of my invention are as follows:

With the plow in the plow lifting position as shown in Fig. 2, when it becomes necessary to raise the plows the operator will draw on the cable $D^2$ and pull the roller $D^5$ out from the clutch links. This will permit the spring $C^{12}$ to force the roller $C^{11}$ into engagement with the clutch disk, and since this clutch disk is always rotating in response to the forward movement of the plow frame, the square shaft $C^5$ will commence to rotate. As it rotates the cams $E^2$ will come successively in contact with the rollers $E^5$, forcing the lifting links $E^4$ forward away from the plows to lift the plows as indicated. Since these cams are spaced at different angular positions about the shaft, the plows will be successively raised so that as the plow frame continues to move forward, the plows will be lifted only when they reach a certain predetermined line and the furrow will thus have a square end.

While this operation is taking place, the gear on the short sub-shaft will have been rotated and the cam thereon will assume the position shown in Fig. 7, rocking the latch, actuating the rocker arms G on the rocker shaft $E^3$ into the position shown to compress the spring $G^5$ and draw upwardly on the latch link $G^1$, thus depressing the latching lip $G^3$. As the rotation continues and as this lever is moved back to lift the plow, the latch will go behind the stop $G^4$ and then as the rotation continues the cam $E^2$ will lift the roller $E^5$ gradually and permit the latching lip $G^3$ to engage the stop $G^4$, thus holding the plow out of the ground in the position as indicated in Fig. 3. As soon as the shaft $C^5$ has made a complete revolution and lifted all of the plows out of the ground, the cam surfaces $D^6$, $D^7$ will come into contact with the roller $D^5$, since the roller is now held back by the spring $D^1$ and the roller $C^{11}$ will thus be drawn out of contact with the clutch disk and the shaft $C^5$ will stop and will no longer rotate.

When it is desired to lower the plows into the ground again, the clutch is thrown as indicated above to rotate the square shaft. This causes the rotation of the gear $F^1$ which has twice as many teeth as F to continue until the roller $F^4$ drops down off of the cam $F^3$ and the spring $F^8$ then operates to force the rock shaft $E^3$ into such position that the spring $G^6$ is compressed, thus tending to lift the latch $G^3$, but this lifting cannot take place owing to the fact that the weight of the plow holds the latch against the stop. The cam $F^9$ is so positioned with respect to the cam $F^3$ that as the gear carrying them rotates the roller $F^4$ will follow the contour of the cam $F^3$, that is to say, the cam $F^9$ brings the roller $F^4$ back toward the shaft $F^2$ to throw the rock arm $F^7$ downwardly in the same direction that it is yieldingly drawn by the spring $F^8$.

However, when the cam $E^2$ comes around and releases this weight, the latch instantly flies up. Then as the cam continues its rotation, leaving the cam roller, the plow is allowed to gradually drop into the ground as the roller rides along the cam. Thus the lifting cam has a three-fold function. It lifts the plows which are then locked in the up position by an additional means, it subsequently releases the lock means and finally eases the plow into the ground. The cam, however, does not itself act as the lock means and does not itself support or hold the plows out of the ground at any time, except during the actual progress of the lifting or of the lowering operation, but the spring latch is what holds the plows out, operating as it does in response to the operation of the cam.

It will be noted that when the roller $D^5$ engages the cam $D^7$ it forces the lever which carries the cam back, and as the roller $D^5$ engages the notch $D^{11}$ it comes in contact with the cam surface $D^6$.

It will be evident, referring for instance to Fig. 7, that the part $E^2$ when it forces the roller $E^5$ farther away and swings the arm $E^4$ so far that the latch $G^3$ can slip, over the stop $G^4$ and then as the part $E^2$ goes on the arm $E^4$ swings back and the latch $G^3$ settles down against the stop $G^4$ and it is this pressure on the arm $G^3$ against the stop $G^4$ which holds the stops in position and permits the operation whereby the spring tension is applied tending yieldingly to disengage the latch $G^3$ and stop $G^4$ but not actually doing so until the pressure of $G^3$ on $G^4$ is released by the next passage of the cam $E^2$.

I claim:

1. A plow lift comprising a lifting lever, means for oscillating it, a latch lever pivoted thereon, a stop in opposition to said latch lever, a controlling rod carried by said lifting lever and in pivotal engagement with said latch lever, operating means for said controlling rod and yielding connections between it and said operating means.

2. A plow lift comprising a lifting lever, means for rotating it, a latch lever pivoted thereon, a stop in opposition to said latch lever, a controlling rod carried by said lifting lever and in pivotal engagement with said latch lever, operating means for said controlling rod comprising a rocker arm and yielding connections between it and said operating means.

3. A plow lift comprising a cam shaft having cams thereon and means for rotating it, a rock shaft parallel therewith and having plow lifting levers pivotally mounted thereon in opposition to said cams, rocker arms mounted on said rock shaft, locking means and controlling rods therefor mounted on said levers and a yielding connection interposed between said controlling rods and rocker arms.

4. A plow lift comprising a cam shaft having cams thereon and means for rotating it, a rock shaft parallel therewith and having plow lifting levers pivotally mounted thereon in opposition to said cams, rocker arms mounted on said rock shaft, locking means and controlling rods therefor mounted on said levers and a yielding connection interposed between said controlling rods and rocker arms and means responsive to the rotation of the cam shaft for rocking said rock shaft.

5. A plow lift comprising a cam shaft having cams thereon and means for rotating it, a rock shaft parallel therewith and having plow lifting levers pivotally mounted thereon in opposition to said cams, rocker arms mounted on said rock shaft, locking means and controlling rods therefor mounted on said levers and a yielding connection interposed between said controlling rods and rocker arms and means responsive to the rotation of the cam shaft for rotating said rock shaft and means for causing the rock shaft to assume a locking and unlocking position once during two revolutions of the cam shaft.

6. In a plow lift a plow lifting lever, a latch pivotally mounted thereon, a stop against which said latch is adapted to rest, a control rod carried by said lever pivoted at one end on said latch, a rocker arm and yielding connections between said rocker arm and said rod.

7. In a plow lift a plow lifting lever, a latch pivotally mounted thereon, a stop against which said latch is adapted to rest, a control rod carried by said lever pivoted at one end on said latch, a rocker arm and yielding connections between said rocker arm and said rod, means for operating said rocker arm to alternately press said rod upward and yieldingly press it downward to move the latch alternately into operative and inoperative positions.

8. In a plow lift a plow lifting lever, a latch pivotally mounted thereon, a stop against which said latch is adapted to rest, a control rod carried by said lever pivoted at one end on said latch, a rocker arm and yielding connections between said rocker arm and said rod, means for operating said rocker arm to alternately press said rod upward and yieldingly press it downward to move the latch alternately into operative and inoperative positions said means comprising a rocker shaft upon which the rocker arm is mounted, a cam arm mounted on said rocker shaft and cams rotatably mounted in opposition to said cam arm.

9. In a plow lift a swinging plow lifting lever, a locking means carried thereby, a shaft and means carried thereby for rocking said lever to raise and lower the plows and spring operated means carried by said shaft for yieldingly forcing the lock into a locking position as the plows are being raised and for exerting a yielding force to swing the lock out of the locking position after the plows are locked.

10. A gang plow comprising a frame, plows pivotally mounted thereon and a plow controlling means comprising a shaft, a series of cams angularly spaced thereon, means for raising the plows operated by one face of said cams during a complete revolution of the shaft in one direction and means for lowering the plows operated from the other faces of the cams during the next succeeding complete revolution of the shaft.

11. A gang plow device comprising a frame, a series of plows pivoted thereto, a shaft, plow controlling means for intermittently rotating the shaft by successive steps in the same direction and means connected with the plows for raising them responsive to one of such steps of revolution and lowering them responsive to the next succeeding step, and a lock to hold the plows in the lifted position, yielding lock operating means and means for placing such operating means in tension ready to operate at the end of the forward movement of said plow controlling means in their action of raising the plows.

12. A gang plow device comprising a frame, a series of plows pivoted thereto, a shaft, a series of cam devices thereon for controlling the plows, means for intermittently rotating the shaft by successive steps in the same direction, means connected to the plows for raising them responsive to one of such steps of revolution and lowering them responsive to the next succeeding step and a lock to hold the plows in the lifted position, yielding lock operating means and means for placing such operating means in tension ready to operate at the end of the forward movement of said plow controlling cam devices in their action of raising the plows.

13. A gang plow device comprising a frame, a series of plows pivoted thereto, a shaft, plow controlling means for intermittently rotating the shaft by successive revolutions in the same direction, means connected with the plows for raising them responsive to one of such complete revolutions and lowering them responsive to the next succeeding revolution and a lock to hold the plows in the lifted position, yielding lock operating means and means for placing such operating means in tension ready to operate at the end of the forward movement of said plow controlling means in their action of raising the plows.

14. A gang plow device comprising a frame, a series of plows pivoted thereto, a shaft, a series of cam devices thereon for controlling the plows, means for intermittently rotating the shaft by successive revolutions in the same direction, means connected to the plows for raising them responsive to one of such complete revolutions and lowering them responsive to the next succeeding revolution and a lock to hold the plows in the lifted position, yielding lock operating means and means for placing such operating means in tension ready to operate at the end of the forward movement of said plow controlling cam devices in their action of raising the plows.

15. A gang plow device comprising a frame, a series of plows pivoted thereto, a shaft, plow controlling means for intermittently rotating the shaft by successive steps in the same direction, means connected with the plows for raising them responsive to one of such steps of revolution and lowering them responsive to the next succeeding step and a release to release the plows from their elevated position operated at the beginning of the lowering action of the plow controlling means.

16. A gang plow device comprising a frame, a series of plows pivoted thereto, a shaft, a series of cam devices thereon for controlling the plows, means for intermittently rotating the shaft by successive steps in the same direction, means connected to the plows for raising them responsive to one of such steps of revolution and lowering them responsive to the next succeeding step and a release to release the plows from their elevated position operated at the beginning of the lowering action of the plow controlling cam devices.

17. A gang plow device comprising a frame, a series of plows pivoted thereto, a shaft, plow controlling means for intermittently rotating the shaft by successive revolutions in the same direction, means connected with the plows for raising them responsive to one of such complete revolutions and lowering them responsive to the next succeeding revolution and a release to release the plows from their elevated position operated at the beginning of the lowering action of the plow controlling means.

18. A gang plow device comprising a frame, a series of plows pivoted thereto, a shaft, a series of cam devices thereon for controlling the plows, means for intermittently rotating the shaft by successive revolutions in the same direction, means connected to the plows for raising them responsive to one of such complete revolutions and lowering them responsive to the next succeeding revolution and a release to release the plows from their elevated position operated at the beginning of the lowering action of the plow controlling cam devices.

19. In a plow lift, a plow lifting lever, a latch pivotally mounted thereon, a stop against which said latch is adapted to rest, a control rod carried by said lever pivoted at one end on said latch, a rocker arm and yielding connections between said rocker arm and said rod, said connections comprising a plurality of springs.

20. In a plow lift, a plow lifting lever, a latch pivotally mounted thereon, a stop against which said latch is adapted to rest, a control rod carried by said lever pivoted at one end on said latch, a rocker arm and yielding connections between said rocker arm and said rod, said connections comprising a plurality of opposed springs.

21. A plow lift comprising a cam shaft, cams thereon and driving means therefor, plow lifting levers in opposition to said cams, locking means and operating springs therefor mounted on said levers, and means for actuating said springs.

22. A plow lift comprising a cam shaft, cams thereon and driving means therefor, plow lifting levers in opposition to said cams, locking means for said levers, and yielding operating means therefor, said means comprising opposed springs, one adapted to hold the locking means in operative position, and another to remove it therefrom, and means for actuating said springs.

23. A plow lift comprising a cam shaft, cams thereon and driving means therefor, plow lifting levers in opposition to said cams, locking means for said levers, and yielding operating means therefor, said means comprising opposed springs, one adapted to hold the locking means in operative position, and another to remove it therefrom, and yielding means for actuating said springs.

24. A plow lift comprising a cam shaft, cams thereon and driving means therefor, plow lifting levers in opposition to said cams, locking means for said levers, and yielding operating means therefor, said means comprising opposed springs, one adapted to hold the locking means in operative position, and another to remove it therefrom, and automatic means for actuating said springs.

25. A plow lift comprising a cam shaft, cams thereon and driving means therefor, plow lifting levers in opposition to said cams, locking means for said levers, and yielding operating means therefor, said means comprising opposed springs, one adapted to hold the locking means in operative position, and another to remove it therefrom, means for actuating said springs, said means comprising a rock shaft rotated by said cam shaft.

26. A plow lift comprising a cam shaft, cams thereon and driving means therefor, plow lifting levers in opposition to said cams, locking means for said levers, and yielding operating means therefor, said means comprising opposed springs, one adapted to hold the locking means in operative position, and another to remove it therefrom, means for actuating said springs, said means comprising a rock shaft, and yielding means for rotating it, in response to the rotation of said cam shaft.

27. A plow lift comprising a cam shaft, cams thereon and driving means therefor, plow lifting levers in opposition to said cams, locking means and operating means therefor, comprising opposed springs, and means for actuating said springs alternating to lock and unlock said locking means.

28. A plow lift comprising a frame, means for lifting the plows out of the ground, a locking means pivoted intermediate its ends on the plow frame, a yielding means for operating it, a stop engaged by said locking means, said yielding means engaging the ends of said locking means opposite the stop engaging end thereof.

In testimony whereof, I affix my signature in the presence of two witnesses this 15th day of August 1913.

WILLIAM H. C. HIGGINS, Jr.

Witnesses:
 LAMEL M. DOREMUS,
 BESSIE S. RICE.